United States Patent [19]

Frantz

[11] 4,132,240
[45] Jan. 2, 1979

[54] VARIABLE DOUBLE LIP QUIET INLET

[75] Inventor: John J. Frantz, Fairfield, Ohio

[73] Assignee: General Electric Company, Cincinnati, Ohio

[21] Appl. No.: 781,777

[22] Filed: Mar. 28, 1977

[51] Int. Cl.² .............................................. B64D 33/02
[52] U.S. Cl. ................................ 137/15.1; 244/53 B; 181/214
[58] Field of Search ............................ 137/15.1, 15.2; 244/53 B; 181/33 HA

[56] References Cited
U.S. PATENT DOCUMENTS

| 3,446,223 | 5/1969 | Hancock | 137/15.2 |
| 3,618,876 | 11/1971 | Skidmore | 137/15.1 X |
| 3,662,556 | 5/1972 | Poucher | 137/15.1 X |

Primary Examiner—Alan Cohan
Attorney, Agent, or Firm—Robert C. Lampe, Jr.; Derek P. Lawrence

[57] ABSTRACT

An inlet for a gas turbine engine is provided with a fixed geometry upstream lip defining the primary inlet flow passage, and a variable position downstream lip partially defining an efficient auxiliary fluid flow passage through the inlet. The upstream lip is sized to pass all of the engine flow requirements at a near-sonic average Mach number during engine approach operating conditions. Apparatus is provided to position the variable lip for modulating flow through the auxiliary passage during higher engine power settings.

5 Claims, 4 Drawing Figures

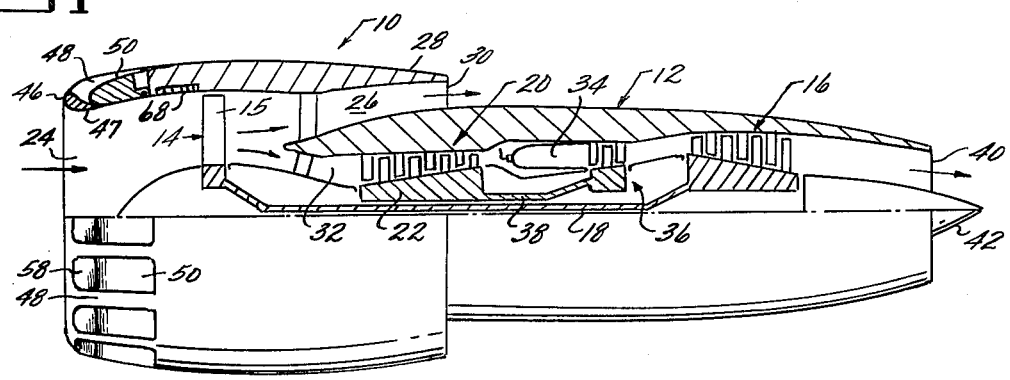
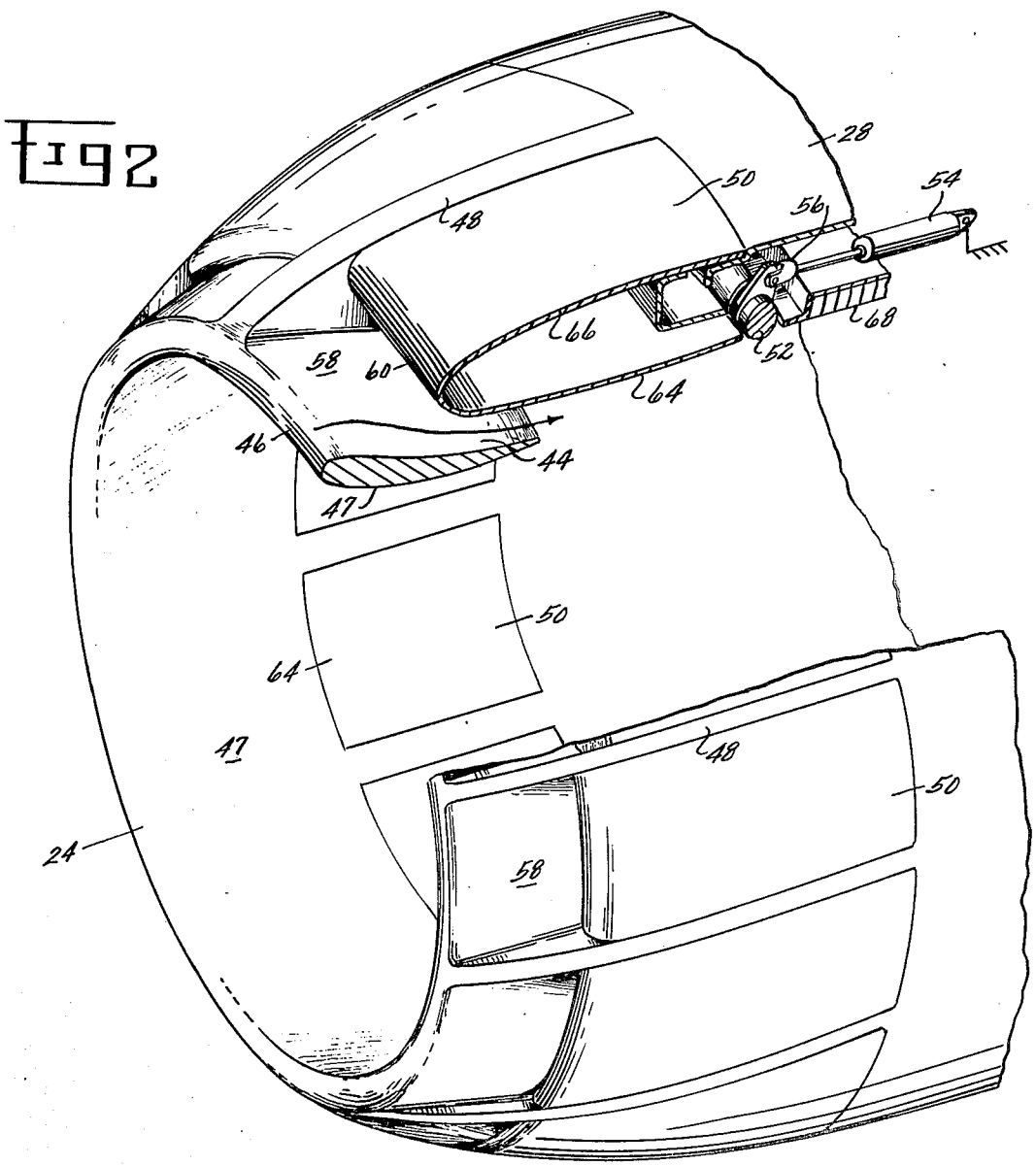

VARIABLE DOUBLE LIP QUIET INLET

BACKGROUND OF THE INVENTION

This invention relates to gas turbine engines and, more particularly, to an inlet for use on a gas turbine engine whereby the operational noise level can be reduced during aircraft take-off and approach operation.

It is well understood that significant sources of noise generated by gas turbine engines are the result of viscous wake and rotor turbulence interaction. And, it is well known that the noise generated thereby is affected by such parameters as blade rotational speed, blade-to-blade spacing, blade geometry and by the proximity of stationary hardware to rotating blade rows. For example, the viscous wake interaction between the wakes of stationary upstream blade rows and moving downstream rows (rotors) results in noise at the rotor blade passing frequency and its harmonics which propagates at the speed of sound with respect to the fluid medium.

There are two currently popular approaches toward suppressing noise generated in this manner. One approach is to line the engine inlet with large amounts of sound-absorbing paneling. This technique is now well known in the art of acoustics, one such scheme being fully disclosed in U.S. Pat. No. 3,542,152— Adamson et al, which is assigned to the assignee of the present invention. However, because of the close proximity of the fan or compressor to the inlet frontal plane, and the lack of acoustic shielding in the forward direction, a significant portion of the noise may still propagate forward out of the inlet duct. Generally, in order to obtain adequate noise suppression, more duct area must be lined than is practically available on the surface of the inlet walls. This has resulted in designs which incorporate acoustically treated, annular flow splitter rings in the inlet flow path with potential performance and foreign object ingestion problems.

Another approach, and one more related to the subject matter of the present invention, is to contour the inlet walls to accelerate the flows to sonic or near sonic velocity. The principle employed is that an acoustic wave cannot propagate upstream against sonic flow since the wave itself can only travel at sonic velocity. This, however, presents some performance problems since a considerable amount of inlet area variation is required because of the large variation in airflow with engine power setting. In particular, the problem is that of reducing the inlet throat area during partial power approach conditions while providing adequate throat area at the higher power take-off and cruise conditions. Several configurations have been proposed. In some schemes, the inlet is sized and contoured for cruise operation, but is provided with means for obdurating the inlet to increase the flow velocity at take-off and approach operation. One such scheme is fully disclosed in U.S. Pat. No. 3,611,724— J. T. Kutney, assigned to the assignee of the present invention, and wherein an inflatable diaphragm is provided at the inlet throat to vary the cross-sectional area of a function of engine operational mode. However, these previous design configurations either have not been as aerodynamically clean as is desired or they have been mechanically complicated. It will therefore be appreciated that although the concept of an accelerating inlet (i.e., one in which the flow is accelerated to sonic or near-sonic velocity) is not new per se, a need exits for applying the concept to a gas turbine engine in an efficient, practical and viable manner.

SUMMARY OF THE INVENTION

Accordingly, it is the primary object of the present invention to reduce noise emanating from within an aircraft gas turbine engine inlet flow duct with a minimum sacrifice in overall performance.

It is another object of the present invention to reduce gas turbine engine noise through the use of an efficient, practical and viable accelerating inlet configuration.

It is yet another object of the present invention to provide a method for operating a variable geometry gas turbine engine inlet whereby the operational noise level may be reduced during certain engine power conditions.

These, and other objects and advantages, will be more clearly understood from the following detailed descriptions, the drawings and specific examples, all of which are intended to be typical of rather than in any way limiting to the present invention.

Briefly stated, the above objectives are attained by sizing the primary inlet duct throat, with due consideration to the gas turbine engine and the aircraft in which it is installed, in order to accelerate the flow to near-sonic velocity (approximately .8 Mach number) at the approach power level. Auxiliary passages are provided to supply the additional air required at take-off, climb and cruise operation. In the approach mode, all of the required air is delivered through a fixed geometry, forward inlet lip in the conventional manner, the lip being sized to provide near-sonic flow at the nominal approach power level. However, at the take-off power level, a plurality of auxiliary passages located downstream of the forward lip and partially defined by a variable position lip are opened to provide efficient additional flow paths to deliver the extra air required for take-off, climb and cruise operation. Noise suppression is generally not a design consideration for the climb/cruise legs of a flight mission and climb/cruise airflow is generally higher than take-off airflow for typical high bypass turbofan engines. A larger flow area and a correspondingly lower inlet duct flow Mach number are thus desirable for either or both of these reasons. Accordingly, this added area is provided by changing the position of the variable lip, thereby modulating the flow through the additional passages to supply additional airflow and to reduce the duct velocity through the fixed forward lip. Acoustic wall treatment is added as a duct liner to further augment the noise suppression.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

FIG. 1 is a side view, in partial cross section, of a gas turbofan engine incorporating the subject invention;

FIG. 2 is a perspective view of the inlet of the engine of FIG. 1 depicting the subject invention in greater particularity.

DESCRIPTION OF THE PREFERRED EMBODIMENT

Figure 3:
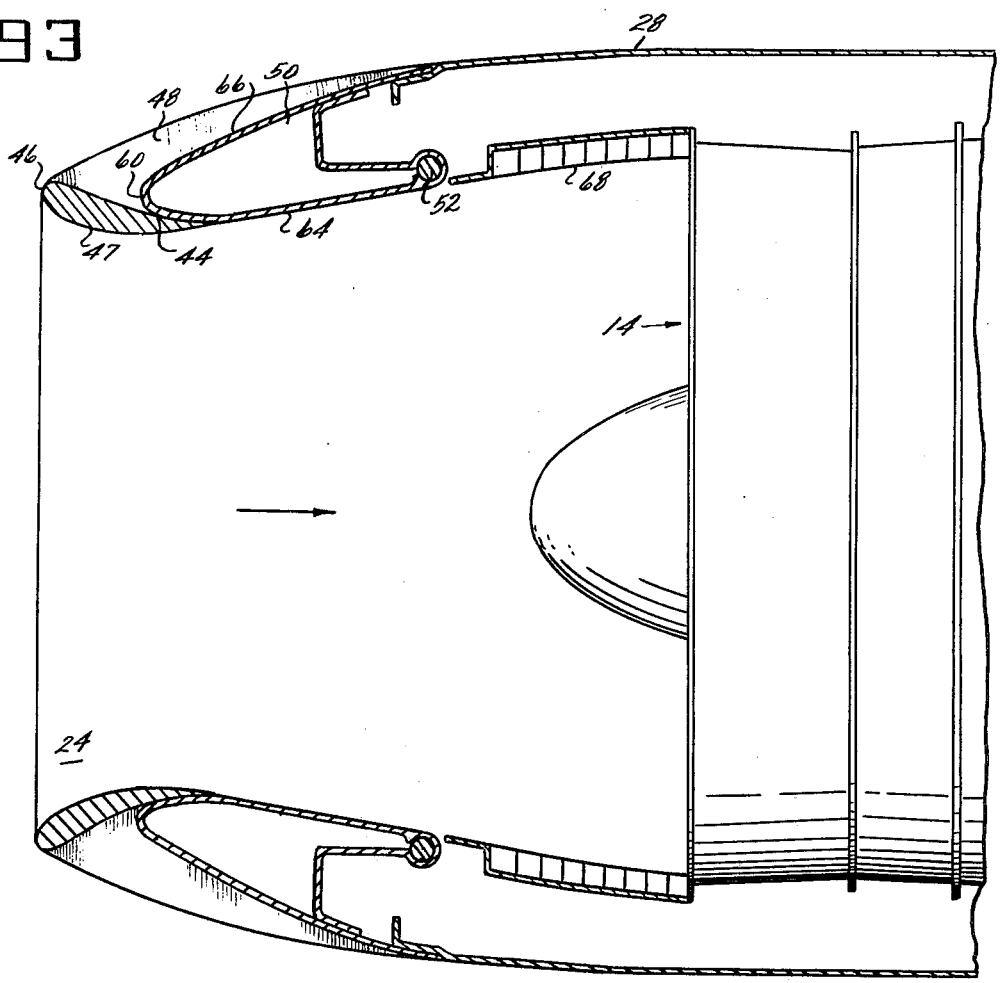
FIGS. 3 and 4 are enlarged cross-sectional views of the inlet of FIG. 2 illustrating the subject invention in two operative positions.

Referring the drawings wherein like numerals correspond to like elements throughout, reference is first directed to FIG. 1 wherein a gas turbine engine depicted generally at 10 and embodying the present invention is diagrammatically shown. This engine may be considered as comprising generally a core engine 12, a fan assembly 14 including a stage of fan blades 15, and a fan turbine 16 which is interconnected to the fan assembly 14 by shaft 18. The core engine 12 includes an axial flow compressor 20 having a rotor 22. Air enters inlet 24 and is initially compressed by fan assembly 14. A first portion of this compressed air enters the fan bypass duct 26 defined, in part, by core engine 12 and a circumscribing fan cowl or nacelle 28 and discharges through a fan nozzle 30. A second portion of the compressed air enters inlet 32, is further compressed by the axial flow compressor 20 and then is discharged to a combustor 34 where fuel is burned to provide high energy combustion gases which drive a turbine 36. The turbine 36, in turn, drives the rotor 22 through a shaft 38 in the usual manner of a gas turbine engine. The hot gases of combustion then pass through and drive the fan turbine 16 which, in turn, drives the fan assembly 14. A propulsive force is thus obtained by the action of the fan assembly 14 discharging air from the fan bypass duct 26 through the fan nozzle 30 and by the discharge of combustion gases from a core engine nozzle 40 defined, in part, by plug 42. The above description is typical of many present-day gas turbine engines and is not meant to be limiting to the present invention, as it will become readily apparent from the following description that the present invention is capable of application to any device passing flow therethrough and having noise emanating from within, and is not necessarily restricted to use with the particular gas turbofan engine configuration depicted herein. The foregoing description of the operation of the engine depicted in FIG. 1 is, therefore, merely meant to be illustrative of one type of application.

Figure 4:
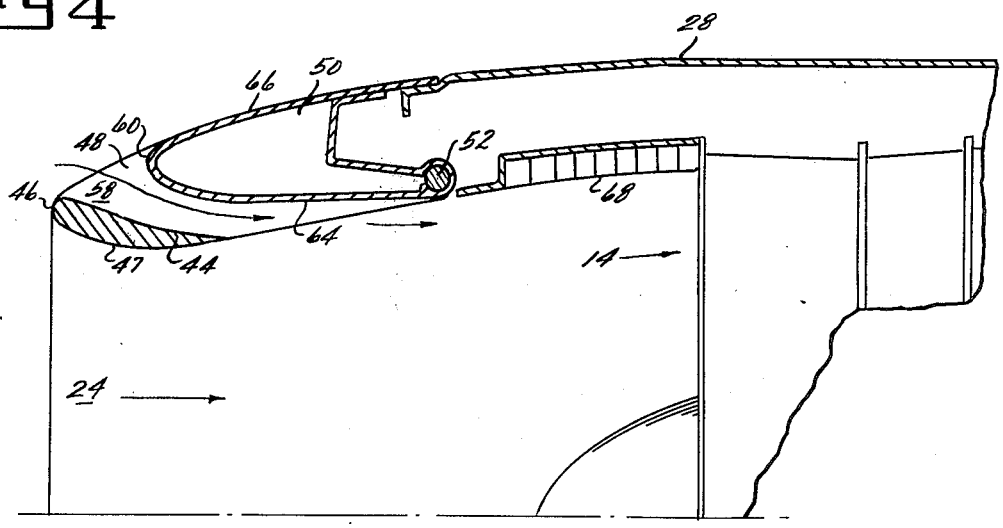

Referring now to FIGS. 2–4 wherein the inlet 24 is depicted in greater particularity, attention is first directed to FIG. 2 wherein the inlet is shown to comprise a fixed annular member 44 aerodynamically contoured in the manner of a flow splitter and having a fixed geometry, contoured lip 46 defining a primary flow passage 47. Member 44 is cantilevered from the stationary cowl or nacelle 28 through a plurality of circumferentially spaced struts 48. Between each pair of laterally adjacent struts there is located an aerodynamically contoured lip 50 which is pivotably connected to cowl 28 as at connection 52 and the position of which may be controlled by any of a number of known actuation systems such as hydraulic actuator 54 and crank 56. Variable lip 50, fixed annular member 44 and struts 48 cooperate to define a plurality of circumferentially spaced, aerodynamically contoured, variable area auxiliary passages 58 extending through the inlet and which can deliver air to the fan 14 as required. Each lip 50 is aerodynamically contoured at its leading edge 60 to selectively and efficiently capture a portion of the airflow which bypasses the fixed geometry forward lip 46. Thus, in the perspective view of FIG. 2, the inlet appears as a single cowl with several auxiliary passages 58 in the forward portion thereof. In the side views of FIGS. 3 and 4, the movable lip 50 clearly appears as a variable area inlet to passages 58. Additionally, it is clear from FIGS. 3 and 4 that the radially inner wall 64 of lip 50 forms an aerodynamically smooth flow path transition between forward annular member 44 and aft cowl 28 in the closed position, and an aerodynamically smooth passage will in the open position. Furthermore, outer lip wall 66 forms an aerodynamically smooth extension of cowl 28 in the open position of FIG. 4 without creating excessive drag in the closed position of FIG. 3 which is applicable to low speed, part-power operation. Thus, in either position, the variable position lip remains within the envelope of a theoretical, geometrically similar inlet having only a single lip 46 and lacking auxiliary passages 58 (see FIG. 3). Acoustic wall treatment 68 of a known variety, such as cellular honeycomb or bulk absorber, is provided within the fixed cowl section to further enhance acoustic suppression.

A unique feature of this inlet is that the primary flow passage 47 defined by fixed annular member 44 is sized to yield a near-sonic, onedimensional Mach number (approximately Mach .8 and higher) at approach power settings. In this approach mode, the variable position lips 50 are rotated radially inwardly by their respective actuation means so that the contoured leading edges thereof are in contact with the contoured annular member 44 as shown in FIG. 3, thereby functioning as valves to close off the auxiliary flow passages 58. Thus, the fixed forward lip of the inlet delivers the air, as represented by the arrow, in the conventional manner at near-sonic velocity to attenuate engine-generated noise.

At take-off power, the variable position lips 50 are rotated outwardly to expose auxiliary passages 58 which function as efficient secondary flow paths to supply the extra air required at take-off power conditions. The lips are rotated by an amount necessary to pass the required amount of additional flow bypassing fixed geometry lips 46 and, at take-off power level, by an amount which will create near-sonic velocities within auxiliary passages 58 to attenuate noise emanating therethrough. Since noise suppression is generally not a concern during the climb and cruise portions of the flight mission, and since climb/cruise airflow is generally higher than take-off airflow in typical high bypass ratio gas turbofan engines, a larger total inlet flow area becomes desirable. This area is provided by positioning the variable position lips 50 as shown in FIG. 4, thereby exposing more entrance area for the auxiliary passages 58 and lowering the velocity in primary flow passage 47.

Clearly, the double lip inlet of the present invention is applicable to any fan, compressor or fluid flow device. Its advantage over prior art inlets is that it provides a solution to the drag and pressure recovery problems of emerging near-sonic aircraft designs where the design requirements range from low speed operation to speeds approaching Mach 0.95. The approach power noise suppression problems are solved by the present invention with minimum compromise to take-off or cruise performance. The inlet creates low drag because the auxiliary passages act as efficient cowl bleed devices due to their clean aerodynamic profile. Also, because of the aerodynamically clean design, pressure recovery is high and total pressure distortion is minimized. Additionally, the variable lip feature is mechanically simple, offering control flexibility.

It should be obvious to one skilled in the art that certain changes can be made to the above-described invention without departing from the broad inventive concepts thereof. For example, as noted hereinabove, the invention is not limited to gas turbine engines but may be utilized on any noise-propagating flow device. Additionally, numerous varieties of actuation schemes may be employed to position variable lip 50. Furthermore, acoustic wall treatment could line the interior of both annular member 44 and variable position lips 50 to further enhance acoustic suppression. It is intended that the appended claims cover these and all other variations in the present invention's broader inventive concepts.

Having thus described the invention, what is claimed as novel and desired to be secured by Letters Patent of the United States is:

1. In a method of operating an aircraft gas turbine engine, the steps of:
    passing substantially all of the required engine airflow through a fixed geometry forward inlet lip at a near-sonic average Mach number during engine approach power conditions, and
    passing additional airflow through an inlet passage defined in part by a downstream variable position lip during higher engine power conditions.

2. In a method of operating an aircraft gas turbine engine having an inlet comprising a fixed geometry forward lip and a downstream passage extending through the inlet and defined in part by a variable position lip, the steps of:
    passing substantially all of the required engine air through the fixed geometry lip at a near-sonic average Mach number during engine approach power conditions, and
    positioning the variable lip for modulating an auxiliary flow of air through the passage at higher engine power settings.

3. An inlet for a fluid flow device comprising an upstream member which is fixed with respect to a stationary cowl and which is provided with an aerodynamically contoured, fixed geometry, upstream lip for passing a primary flow, a downstream variable position lip having an inner wall and an outer wall which is positionable with respect to said cowl and which is aerodynamically contoured, a passage defined in part by said variable position lip for the auxiliary entry of flow into the inlet, means for connecting said variable position lip to said cowl, and means for positioning said variable position lip between two operative positions, one in which said variable position lip is positioned inwardly into cooperation with said upstream member to close said passage and the other in which said variable position lip is positioned outwardly with respect to said upstream member to open said passage, and wherein said inner wall is contoured to provide, in cooperation with said fixed upstream member, an aerodynamically smooth internal flow path between said upstream member and said cowl when said passage is closed, and said outer wall is contoured to provide an aerodynamically smooth external flow path extension of said cowl when said passage is open.

4. The inlet as recited in claim 3 wherein said connecting means is of the pivotable type.

5. An inlet for a fluid flow device comprising an annular upstream member which is fixed with respect to a stationary cowl and which is provided with an aerodynamically contoured, fixed geometry, upstream lip for passing a primary flow, a downstream variable position lip which is positionable with respect to said cowl and which is aerodynamically contoured, a passage defined in part by said variable position lip for the auxiliary entry of flow into the inlet, means for connecting said variable position lip to said cowl, and means for positioning said variable position lip between two operative positions, one in which said variable position lip is positioned inwardly into cooperation with said upstream member to close said passage and the other in which said variable position lip is positioned outwardly with respect to said upstream member to open said passage, and wherein said upstream member is cantilevered from said cowl by a plurality of generally axially extending struts connected therebetween.

* * * * *